United States Patent
Silvia

(10) Patent No.: US 6,622,982 B2
(45) Date of Patent: Sep. 23, 2003

(54) DEVICE FOR THE SIDE TRANSLATION OF A MOTOR-VEHICLE SEAT

(75) Inventor: Leone Silvia, Turin (IT)

(73) Assignee: Fiat Auto S.p.A., Turin (IT)

( * ) Notice: Subject to any disclaimer, the term of this patent is extended or adjusted under 35 U.S.C. 154(b) by 61 days.

(21) Appl. No.: 10/047,478

(22) Filed: Oct. 23, 2001

(65) Prior Publication Data

US 2002/0149250 A1 Oct. 17, 2002

(30) Foreign Application Priority Data

Oct. 24, 2000 (IT) ..................................... TO2000A1009

(51) Int. Cl.[7] ............................................... F16M 13/00
(52) U.S. Cl. ...................................................... 248/424
(58) Field of Search ................................. 248/429, 430, 248/424; 297/344.1, 463.1; 296/64, 65.1, 68.1, 65.11, 65.12

(56) References Cited

U.S. PATENT DOCUMENTS 4,834,452 A     5/1989   Goodrich
5,799,920 A  *  9/1998   Wittkowsky et al. ........ 248/429
2002/0195832 A1 * 12/2002  Motozawa ............... 296/65.12

FOREIGN PATENT DOCUMENTS

| DE | 44 15 585 A1 | 1/1995 |
|----|---|---|
| EP | 0 943 482 A2 | 9/1999 |
| EP | 0 972 671 A1 | 1/2000 |
| GB | 333354 | 8/1930 |
| GB | 875049 | 8/1930 |

* cited by examiner

Primary Examiner—Leslie A. Braun
Assistant Examiner—Kofi Schulterbrandt
(74) Attorney, Agent, or Firm—Merchant & Gould, P.C.

(57) ABSTRACT

Description of a device for the side translation of a seat in a motor-vehicle, consisting of two sliding guides (4, 5) placed transversally to the axis of the seat, at least one of said guides being articulated, either directly or indirectly, to the end of a spring element (15) that can be compressed by rotating a control lever (20), so that the stretching of said spring element(15), subsequent to its compression, causes the side translation of said guides (4, 5) which are united between them to form a frame.

6 Claims, 5 Drawing Sheets

DEVICE FOR THE SIDE TRANSLATION OF A MOTOR-VEHICLE SEAT

DESCRIPTION

The present invention refers to a device for the side translation of a front seat in a motor-vehicle, adapted to make the entrance easier for the passenger. The known art provides only devices for the longitudinal translation of the seats, said devices being adapted to allow the driver or the passengers to adjust longitudinally the position of the seat inside the motor-vehicle, according to their need.

The previous art does not provide motor-vehicle seats equipped with a device that allows their side translation in order to make the entrance easier for the driver or the passengers, especially in the case of elder or handicapped people. It is an object of the present invention to provide this kind of device for seats in motor-vehicles.

Said object is achieved by means of a device for the side translation of a motor-vehicle seat.

Further characteristics and advantages will become clear from the following description which refers to the appended drawings, provided as non-restrictive example, and in which.

Figure 1:
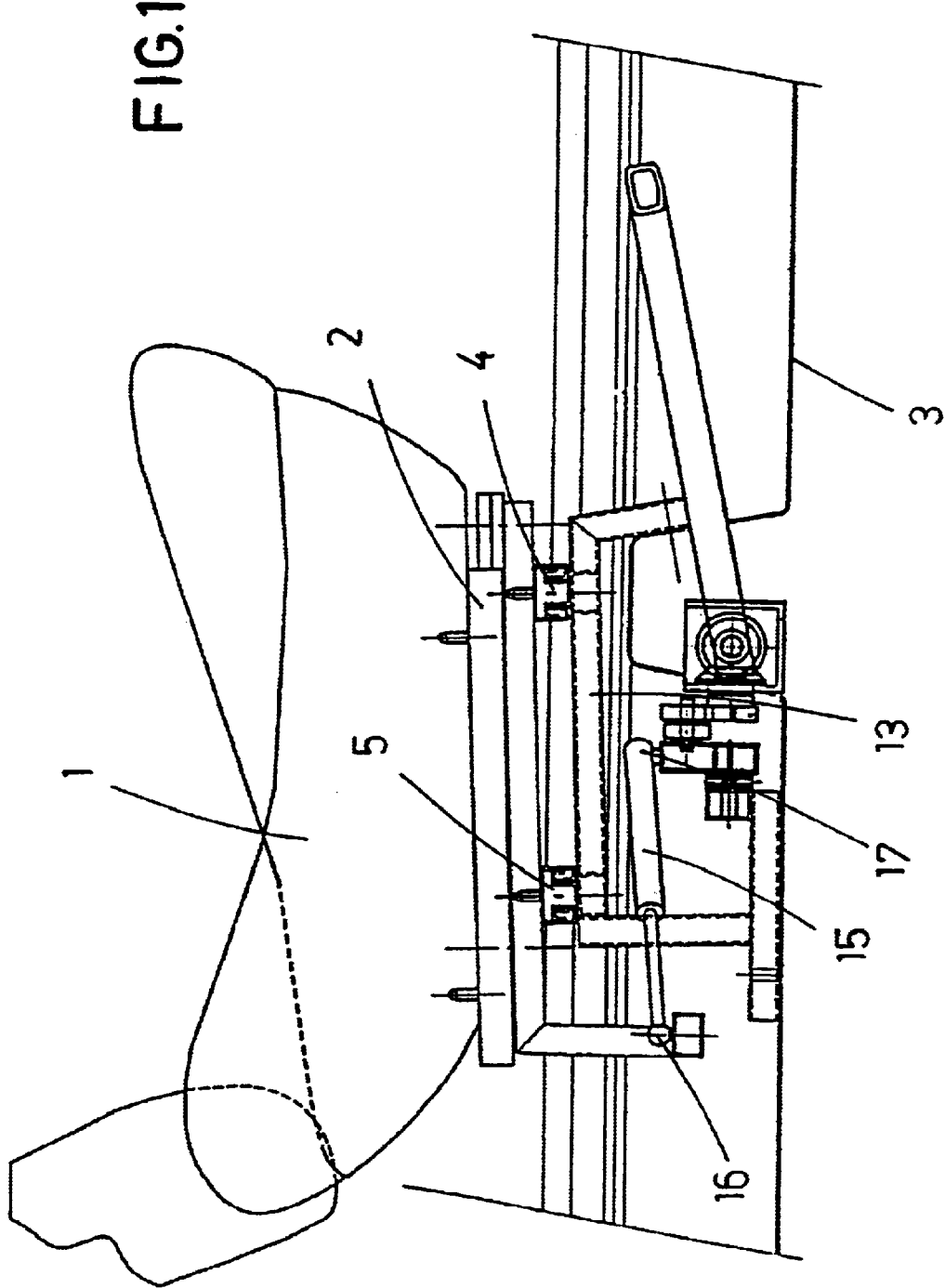
FIG. 1 is a side view of a motor-vehicle seat provided with the device for side translation according to the present invention.
Figure 2:
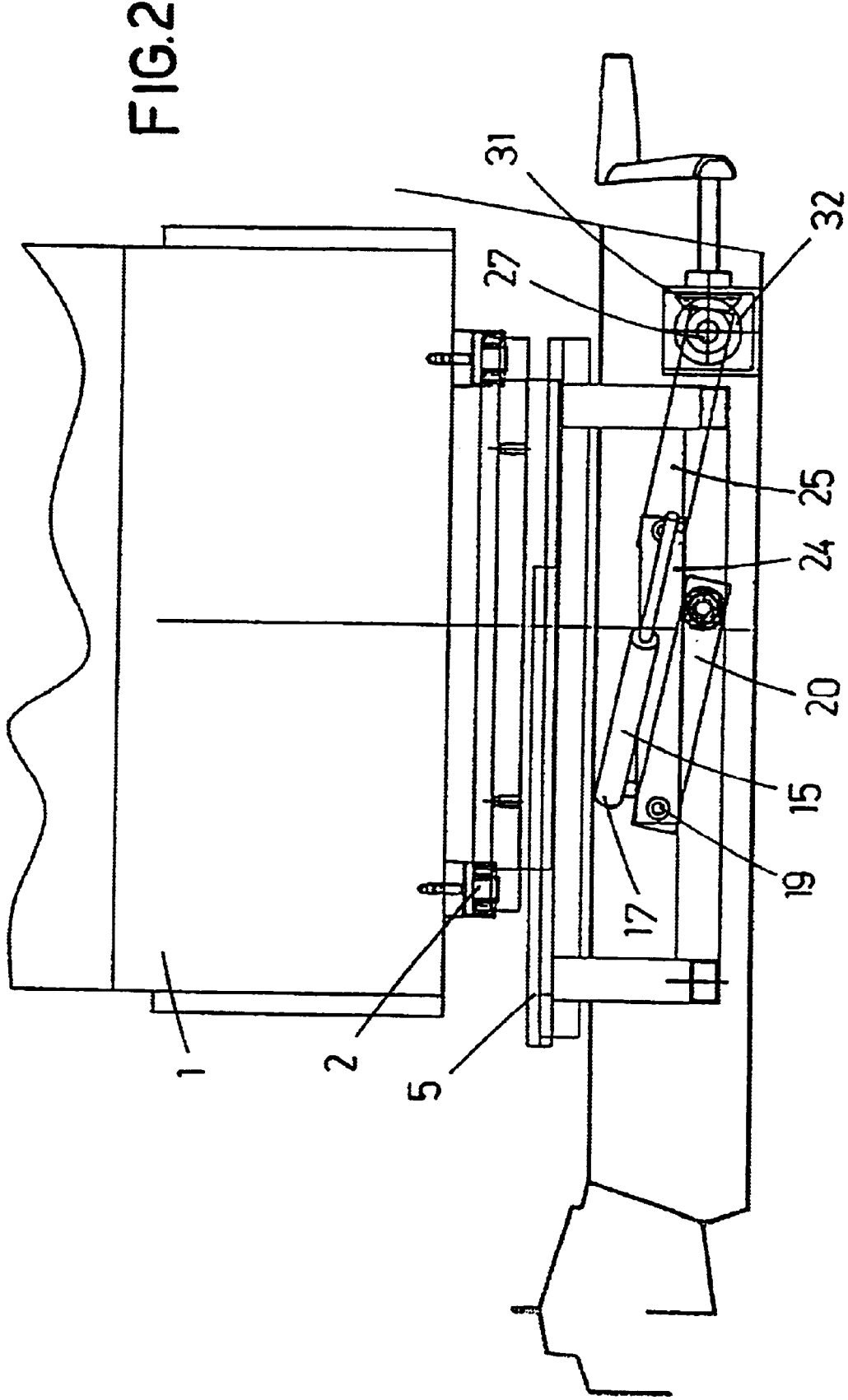
FIG. 2 is a rear view of the device in FIG. 1.
Figure 3:
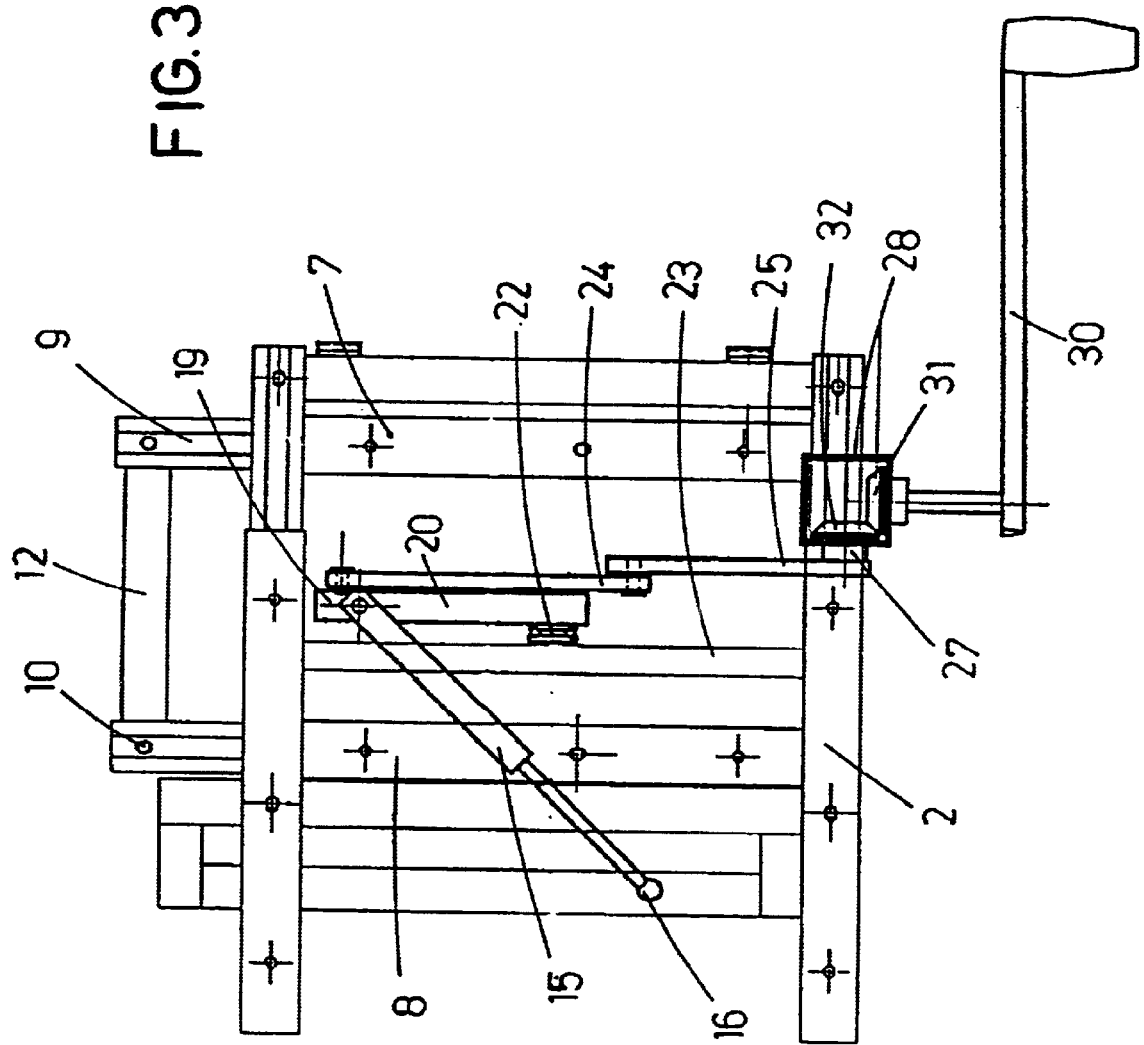
FIG. 3 is a top view of the device for translation in FIGS. 1 and 2, without the seat.
Figure 4:
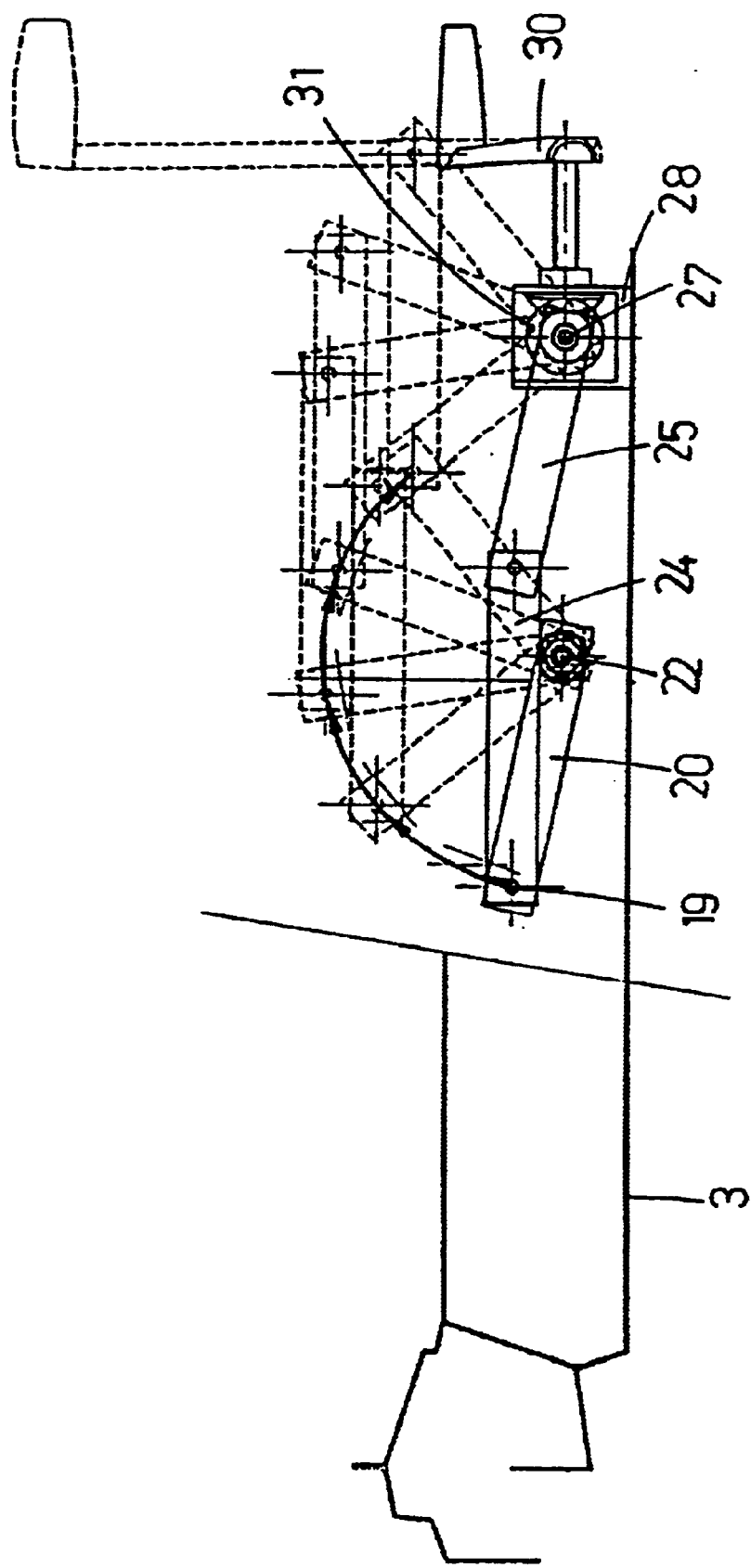
FIG. 4 is a view of part of the control mechanism of the device in FIG. 1, the different operating positions being hatched, and FIGS. from 5 to 8 are schemes of the order of the operative phases of the device according to the invention.

With reference to the figures, reference number 1 indicates a motor-vehicle seat provided at its lower part with a frame 2 which is intended to allow its longitudinal translation inside the motor-vehicle. Between the frame 2 and the floor of the body 3, and fixed to the body itself, there is the side translation device according to the invention. It consists of two sliding guides 4 and 5, made of two channels which are inserted the one into the other and slide mutually. The external channels 7 and 8 are fixed to the frame 2 of the seat 1, while the internal channels 9 and 10 are connected the one to the other by means of two arched cross members 12 and 13, in order to form a rigid quadrilateral frame, which is fixed to the body and on which the two external channels can slide. A gas-spring 15 of the usual type presents one end 16 articulated to a fixed part of the seat of the frame 2 under it, while its other end 17 is articulated to an end 19 of a control lever 20. Said lever is articulated on an axis 22 which is fixed to a traverse 23 integral with the body 3 of the vehicle in a position which is basically central in relationship to the seat 1, below it. The control lever 20 is adapted for a rotation of at least 180° on its axis 22, under control of a pair of levers 24 and 25, which together with the control lever form a parallelogram. The lever 25, presents one end connected to the lever 24 while the other end is integral to an axis 27 rotating on a support 28 fixed to the body. The rotation of said axis 27 is controlled by a handle 30, connected to a pair of cone gears 31 an 32, the one being integral with the handle itself and the other with the axis 27.

The translation device works as follows.

Figure 5:
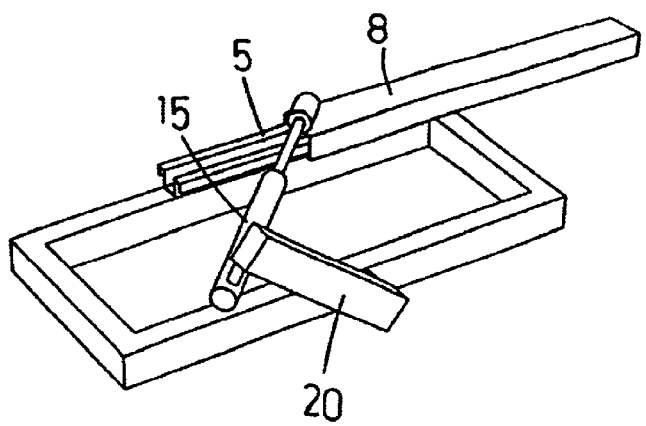
Figure 6:
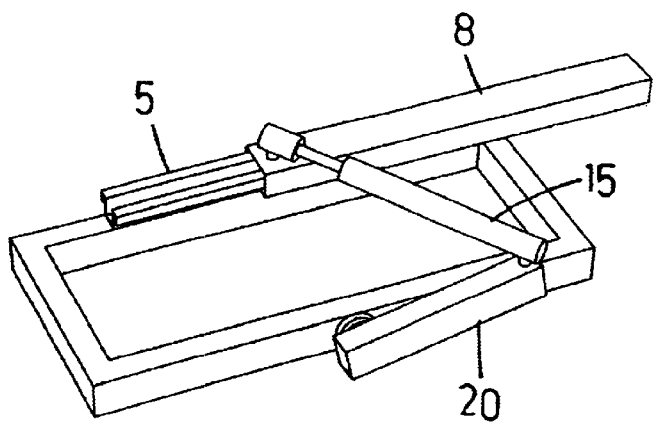
Figure 7:
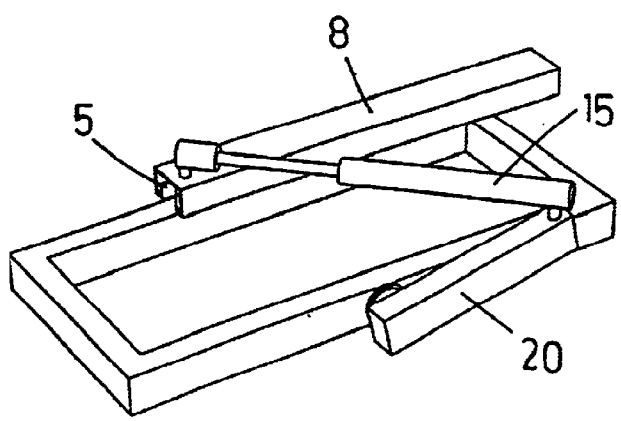
Figure 8:
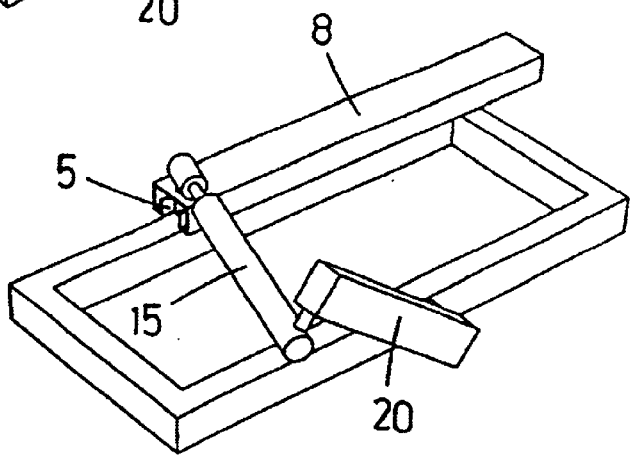

With reference in particular to FIGS. 5 to 8, in which schemes of the different operation phases are shown, it is possible to observe that the gas spring 15 is connected, in this embodiment, to the external channel 8 of the guide 5, while the control lever 20 is rotatably connected to the support frame of the guides 4 and 5. The guide 4 and the whole operation mechanism of the lever 20 are not represented for sake of simplicity.

When the lever 20 is in the position in which it is rotated towards the left side of the person watching it (that is, towards the right side in case the person is sitting on the motor-vehicle seat), the channel 8, and the seat with it, is pushed by the spring 15, which tends to stretch itself, towards the opposite side, that is against the sill of the motor-vehicle. The seat is therefore translated laterally, and in this translated position the centre plane of the seat 2 is moved with respect to the plane passing at the axis of the steering wheel. Once the user is sit (i.e. the driver) he rotates the handle 30 and together with it, thanks to the cone coupling and the levers 24 and 25, the control lever 20, which bend towards the right side (FIG. 6) thus compressing the gas spring 15. Afterwards the spring 15 gets stretched (FIG. 7) and causes the side translation of the seat 1 on the guide 5 (in this scheme) till a stop position (not shown) in which the centre plane of the seat basically corresponds to the plane passing at the axis of the steering wheel. This position of the seat is the very position which allows to drive the car or, in case of a passenger, to seat in the correct position. At the moment of getting off the motor-vehicle, the user can take the handle 30 back to its original position, so that the lever 20 can rotate again towards the left side (FIG. 8) thus compressing the gas spring, in order to achieve, by means of its own stretching (FIG. 5), the translation of the guide 5 and therefore the translation of the seat against the sill.

The details of the device above described can be obviously modified by implementing solutions which are already known to the operators, without going beyond the scope of the present invention. The pantograph control system of the lever 20, can be easily replaced by a control using an electrical motor and a gearset to reduce the movement, or the cone coupling 31 and 32, can be made directly on the rotation axis of the lever 20, using a handle with a prolonging axis of proper size. The device here illustrated does not need locking systems for the seat at the opposite final positions, since this is also a function of the spring 15, the size of which will be such that it can keep a minimum pre-charge.

What is claimed is:

1. A device for side translation of a seat in a motor-vehicle, comprising two sliding guides united between them in order to form a frame and placed transversally to an axis of the seat and connected to it at its lower part, at least one of said guides being articulated, either directly or indirectly, to an end of a spring element that can be compressed by rotating a control lever which is articulated at another end and pivoted on a fixed part of the motor-vehicle, so that stretching of said spring element, subsequent to its compression, causes the side translation of said guides united to form a frame.

2. Device as claimed in claim 1, wherein the spring element is a gas spring.

3. Device as claimed in claim 1, wherein the control lever is operated by means of levers forming a parallelogram.

4. Device as claimed in claim 3,,wherein the parallelogram levers are operated by a handle by means of a coupling of cone gears.

5. Device as claimed in claim 1, wherein the control lever is operated by means of an electrical motor and a gearset to reduce movement.

6. Device as claimed in claim 1, wherein the gas spring is placed under the guides.

* * * * *